UNITED STATES PATENT OFFICE 2,456,176

MONOMERIC ADDITION PRODUCTS OF AZO-BISFORMATES AND POLYFLUOROETHYL-ENES

Richard D. Cramer, Wilmington, Del., assignor to E. I. du Pont de Nemours & Company, Wilmington, Del., a corporation of Delaware No Drawing. Application December 30, 1944, Serial No. 570,759

12 Claims. (Cl. 260—239)

This invention relates to the addition products of certain azobisformates with certain halogen-substituted ethylenes.

An object of this invention is to provide new monomeric addition products of certain esters of azobisformic acid with substituted ethylenes having the general formula:

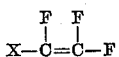

wherein X is hydrogen, fluorine or chlorine. Another object is to provide new compounds which are believed to have the general formula:

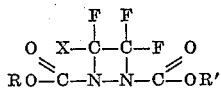

wherein X has the above defined meaning and R and R' are lower aliphatic saturated hydrocarbon radicals. A further object is to provide methods for preparing the said monomeric compounds. Additional objects will become apparent from an examination of the following description and claims.

These and other objects and advantages are accomplished according to the herein-described invention which broadly comprises heating, at a temperature in excess of about 50° C. and below that at which decomposition of the reactants and/or products occurs, in the substantial absence of a polymerization catalyst, an azobisformic acid ester having the general formula ROOC—N=N—COOR' in which each of the R and R' groups is the non-hydroxyl portion of a saturated aliphatic monohydric alcohol, with a polyfluoroethylene having the general formula

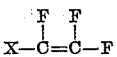

wherein the X substituent is a hydrogen, fluorine or chlorine atom. Said heating is continued until the reaction is complete as evidenced by the cessation further pressure drops and the monomeric reaction product thereby obtained is then recovered by conventional means.

In a more restricted embodiment of this invention an azobisformic acid ester having the general formula ROOC—N=N—COOR' wherein each of the R and R' groups is the non-hydroxyl portion of a saturated aliphatic monohydric alcohol in which the hydroxyl group is attached to a carbon atom which is in turn attached to at least one hydrogen atom, is heated at a temperature within the range of from 50° C. to 300° C. in the absence of any polymerization catalyst with a polyfluoroethylene having the general formula

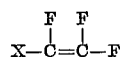

as hereinbefore defined.

In one preferred embodiment of this invention diethyl azobisformate is heated at a temperature within the range of from 140° C. to 250° C. in the absence of any polymerization catalyst with trifluoroethylene, tetrafluoroethylene or chlorotrifluoroethylene.

Various arrangements and selections of equipment for the operation of my process are possible. In a preferred arrangement, however, a pressure reactor is swept with oxygen-free nitrogen, charged with the desired azobisformate, closed, evacuated and cooled to about −70° C. by means of a carbon dioxide-acetone mixture and pressured with the desired polyfluoroethylene. The charged reactor is placed on an agitating rack and agitation and heating are started. After there is no further reaction, as evidenced by a cessation of pressure drops, the reactor is opened, bled of unreacted polyfluorinated ethylene, if any, discharged, and the reaction product isolated by conventional means.

The following example is given for illustrative purposes and is not intended to place any restrictions on the hereindescribed invention.

*Example*

A silver-lined pressure reactor of about 200 cc. capacity is swept with oxygen-free nitrogen and charged with 10 g. of diethyl azobisformate. The reactor is closed, evacuated, cooled in a carbon dioxide-acetone mixture to about −70° C. and charged with 20 g. of tetrafluoroethylene. The charged reactor is placed on an agitating rack and heated to 150° C. for six hours. At the end of this time the reactor is cooled to room temperature, opened, and the contents discharged. The product is distilled at 66° C. under a pressure of 3 mm. The product obtained amounts to 3 grams and is a liquid analyzing 10.26% nitrogen and 26% fluorine and has a refractive index $N_D^{19°\ C.}$ of 1.3853.

The calculated value for $C_8H_{10}O_4N_2F_4$ is 10.22% nitrogen and 27.7% fluorine.

The refractive index of diethyl azobisformate $N_D^{19°C.}$ is 1.4199.

While this invention has been illustrated with particular reference to diethyl azobisformate, it is contemplated that all azobisformic acid esters having the general formula

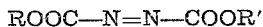
ROOC—N=N—COOR' in which each of the R and R' groups is the non-hydroxyl portion of a saturated aliphatic monohydric alcohol, are operative therein. However, superior products are had with azobisformic acid esters having the general formula

ROOC—N=N—COOR' wherein each of the R and R' groups is the non-hydroxyl portion of a saturated aliphatic monohydric primary or secondary alcohol, i. e., a saturated aliphatic monohydric alcohol in which the hydroxyl group is attached to a carbon atom which is in turn attached to at least one hydrogen atom. Said esters can be readily obtained by reacting the chlorocarbonate obtained from the desired primary or secondary alcohol and phosgene with hydrazine and then oxidizing the resulting hydrazide. Because of their availability, ease of preparation and the superior results had therewith, azobisformic acid esters having the general formula ROOC—N=N—COOR' wherein each of the R and R' groups is the non-hydroxyl portion of a saturated aliphatic primary or secondary alcohol containing not more than eight carbon atoms, are preferably employed in this invention. Optimum results are had with dimethyl-, diethyl-, dipropyl-, dibutyl- and diamyl-azobisformates. Included among examples of azobisformic acid esters operative in this invention, in addition to those specifically disclosed hereinbefore, are: the didodecyl and dioctadecyl ester as well as secondary alcohol esters of azobisformic acid.

Examples of polyfluoroethylenes coming within the scope of the formula

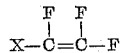

as hereinbefore defined, are: trifluoroethylene, tetrafluoroethylene and chlorotrifluoroethylene.

The process of this invention is operative at temperatures within the range of from 50° C. to 300° C. Generally, however, the process is operated at temperatures within the range of from 140° C. to 250° C. on account of the superior results attained when a temperature within said range is employed.

It is to be understood, of course, that in order to obtain the monomeric products of this invention the reaction mixture of an azobisformic acid ester, as hereinbefore defined, and a polyfluoroethylene, as hereinbefore defined, which is subjected to heating in accordance with this invention must be free from any polymerization catalyst, e. g. polymerization catalysts such as peroxy compounds. In some instances it is desirable to carry out the reaction in the presence of a polymerization inhibitor, e. g., hydroquinone.

If desired, the process of this invention can be carried out in the presence of an inert solvent such as an alcohol, hydrocarbon, or ether, etc., but generally this is not necessary.

As a rule, the reaction is carried out under autogenous pressure but if desired the reaction can be conducted with the application of external pressure, e. g. of the order of 2000 lbs./sq. in. and higher.

The ratio of azobisformic ester to polyfluoroethylene in the reaction mixture is generally 1:1. One or the other of the reactants, however, can be used in excess in order to insure complete utilization of the reactant present in lesser amount.

The products of this invention are monomeric addition products and are believed to be fluoro-1,2-diazetidines, i. e. compounds having the general formula

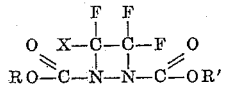

wherein X is a hydrogen, fluorine or chlorine atom and R and R' are the non-hydroxyl portion of saturated aliphatic monohydric alcohols. Thus, when tetrafluoroethylene and diethyl azobisformate are reacted in accordance with this invention, there is obtained a monomeric compound which is believed to be diethyl-3,3,4,4-tetrafluoro-1,2-diazetidine-1,2-dicarboxylate.

The monomeric addition products of this invention are useful as lubricant additives, as transformer oils, as intermediates for conversion to substituted ethylenediamines which are useful as polyamide intermediates, and to dicarboxylic acids which are useful in the synthesis of esters, etc.

As many apparently widely different embodiments of this invention may be made without departing from the spirit and scope thereof, it is to be understood that I do not limit myself to the specific embodiments thereof except as defined in the appended claims.

Having described the present invention, the followng is claimed as new and useful:

1. The process for obtaining a monomeric addition product of an azobisformic acid ester having the general formula ROOC—N=N—COOR' wherein each of the groups R and R' is the non-hydroxyl portion of a saturated aliphatic monohydric alcohol, and a polyfluoroethylene having the general formula

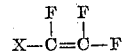

wherein X is an atom of the group consisting of hydrogen atoms, fluorine and chlorine, which comprises heating said ester with said polyfluoroethylene in the substantial absence of a polymerization catalyst at a temperature in excess of about 50° C. and below that at which decomposition occurs.

2. The process for obtaining a monomeric addition product on an azobisformic acid ester having the general formula

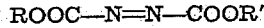
ROOC—N=N—COOR' wherein each of the groups R and R' is the non-hydroxyl portion of a saturated aliphatic monohydric alcohol in which the hydroxyl group is attached to a carbon atom which is in turn attached to at least one hydrogen atom, and a polyfluoroethylene having the general formula

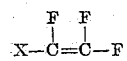

wherein X is an atom of the group consisting of hydrogen atoms, fluorine and chlorine, which comprises heating said ester with said polyfluoroethylene in the absence of a polymerization catalyst at a temperature in excess of about 50° C. and below that at which decomposition occurs.

3. The process for obtaining a monomeric addition product of an azobisformic acid ester having the general formula

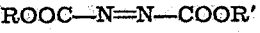
ROOC—N=N—COOR' wherein each of the groups R and R' is the non-hydroxyl portion of a saturated aliphatic monohydric alcohol containing not more than eight carbon atoms and in which the hydroxyl group is attached to a carbon atom which is in turn attached to at least one hydrogen atom, and a polyfluoroethylene having the general forumla

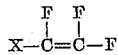

wherein X is an atom of the group consisting of hydrogen atoms, fluorine and chlorine, which comprises heating said ester with said polyfluoroethylene in the absence of a polymerization catalyst at a temperature within the range of from 50° C. to 300° C.

4. The process for obtaining a monomeric addition product of diethyl azobisformate and tetrafluoroethylene which comprises heating diethyl azobisformate with tetrafluoroethylene at autogenous pressure in the absence of any polymerization catalyst at a temperature within the range of from 140° C. to 250° C.

5. Monomeric addition products of the following indicated general formula:

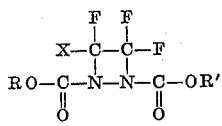

wherein X is an atom of the group consisting of hydrogen atoms, fluorine and chlorine, and R and R' are the non-hydroxyl portions of saturated aliphatic monohydric alcohols, said addition products being obtained by heating in the substantial absence of a polymerization catalyst at a temperature in excess of about 50° C. and below that at which decomposition occurs an azobisformic acid ester having the general formula ROOC—N=N—COOR' wherein R and R' are defined as aforesaid and a polyfluoroethylene having the general formula:

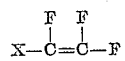

wherein X is defined as aforesaid.

6. Monomeric addition products of the following indicated general formula:

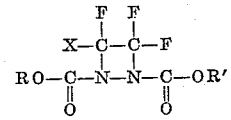

wherein X is an atom of the group consisting of hydrogen atoms, fluorine and chlorine, and R and R' are the non-hydroxyl portions of saturated aliphatic monohydric alcohols in which the hydroxyl group is attached to a carbon atom which is in turn attached to at least one hydrogen atom, said addition products being obtained by heating in the sustantial absence of a polymerization catalyst at a temperature in excess of about 50° C. and below that at which decomposition occurs an azobisformic acid ester having the general formula ROOC—N=N—COOR' wherein R and R' are defined as aforesaid and a polyfluoroethylene having the general formula:

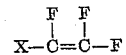

wherein X is defined as aforesaid.

7. Monomeric addition products of the following indicated general formula:

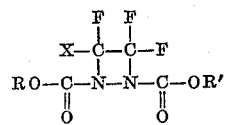

wherein X is an atom of the group consisting of hydrogen atoms, fluorine and chlorine, and R and R' are the non-hydroxyl portions of saturated aliphatic monohydric alcohols containing not more than eight carbon atoms and in which the hydroxyl group is attached to a carbon atom which is in turn attached to at least one hydrogen atom, said addition products being obtained by heating in the substantial absence of a polymerization catalyst at a temperature within the range of from 50° C. to 300° C. an azobisformic acid ester having the general formula

ROOC—N=N—COOR' wherein R and R' are defined as aforesaid and a polyfluoroethylene having the general formula:

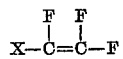

wherein X is defined as aforesaid.

8. A monomeric addition product to the following indicated formula:

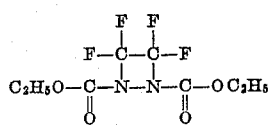

which is a liquid analyzing 10.26% nitrogen and 26% flourine, and having a refractive index $N_D^{19°C.}$ of 1.3853, said addition product being obtained by heating in the substantial absence of a polymerization catalyst at a temperature within the range of from 140° C. to 250° C. diethyl azobisformate and tetrafluoroethylene.

9. The process for obtaining a monomeric addition product of an azobisformic acid ester having the general formula ROOC—N=N—COOR' wherein each of the groups R and R' is the non-hydroxyl portion of a saturated aliphatic monohydric primary alcohol containing not more than eight carbon atoms and a polyfluoroethylene having the general formula

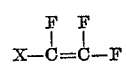

wherein X is an atom of the group consisting of hydrogen atoms, fluorine and chlorine, which comprises heating said ester with said polyfluoroethylene in the substantial absence of a polymerization catalyst at a temperature within the range of from 50° C. to 300° C.

10. The process for obtaining a monomeric addition product of an azobisformic acid ester having the general formula ROOC—N=N—COOR' wherein each of the groups R and R' is the non-hydroxyl portion of a saturated aliphatic monohydric primary alcohol containing not more than eight carbon atoms and tetrafluoroethylene which comprises heating said ester with said tetrafluoroethylene in the absence of a polymerization catalyst at a temperature within the range of from 50° C. to 300° C.

11. A monomeric addition product of the following indicated general formula

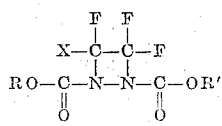

wherein X is an atom of the group consisting of hydrogen atoms, fluorine and chlorine and R and R' are the non-hydroxyl portions of saturated aliphatic monohydric primary alcohols containing not more than eight carbon atoms, said addition product being obtained by heating in the substantial absence of a polymerization catalyst at a temperature within the range of from 50° C. to 300° C. an azobisformic acid ester having the general formula ROOC—N=N—COOR' wherein R and R' are defined as aforesaid and a polyfluoroethylene having the general formula

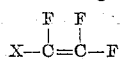

wherein X is defined as aforesaid.

12. A monomeric addition product of the following indicated general formula

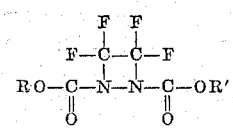

wherein R and R' are the non-hydroxyl portions of saturated aliphatic monohydric primary alcohols containing not more than eight carbon atoms, said addition product being obtained by heating in the substantial absence of a polymerization catalyst at a temperature within the range of from 50° C. to 300° C. an azobisformic acid ester having the general formula

ROOC—N=N—COOR' wherein R and R' are defined as aforesaid and tetrafluoroethylene.

RICHARD D. CRAMER.

REFERENCES CITED

The following references are of record in the file of this patent:

Alder et al.: Berichte, vol. 76–B, pages 27–43 (1943).